United States Patent
Ahn et al.

(10) Patent No.: US 10,883,876 B2
(45) Date of Patent: Jan. 5, 2021

(54) COMPACT SPECTROMETER UNIT AND BIO-SIGNAL MEASURING APPARATUS

(71) Applicant: SAMSUNG ELECTRONICS CO., LTD., Suwon-si (KR)

(72) Inventors: Sung Mo Ahn, Yongin-si (KR); Jin Young Park, Hwaseong-si (KR); Kun Sun Eom, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/661,556

(22) Filed: Oct. 23, 2019

(65) Prior Publication Data

US 2020/0124471 A1    Apr. 23, 2020

(30) Foreign Application Priority Data

Oct. 23, 2018   (KR) .................. 10-2018-0126623

(51) Int. Cl.
*G01J 3/28* (2006.01)
*G01J 3/02* (2006.01)
*G01J 3/12* (2006.01)

(52) U.S. Cl.
CPC ........... *G01J 3/0256* (2013.01); *G01J 3/0264* (2013.01); *G01J 3/28* (2013.01); *G01J 2003/1213* (2013.01)

(58) Field of Classification Search
CPC ........ G01J 3/02; G01J 3/26; G01J 3/18; G01J 3/00; G01J 3/28; G01J 3/0256; G01J 3/0264; G01J 2003/1213
See application file for complete search history.

(56) References Cited

U.S. PATENT DOCUMENTS

| | | | |
|---|---|---|---|
| 6,236,508 B1* | 5/2001 | Stapelbroek | G02B 5/1842 250/216 |
| 7,242,478 B1 | 7/2007 | Dombrowski et al. | |
| 8,054,371 B2 | 11/2011 | Wang et al. | |
| 8,552,359 B2 | 10/2013 | Xu | |
| 9,383,199 B2* | 7/2016 | Imamura | G01C 3/08 |
| 9,568,606 B2 | 2/2017 | Ikemoto | |
| 9,595,553 B2 | 3/2017 | Heimgartner et al. | |
| 9,748,297 B2 | 8/2017 | Heimgartner et al. | |
| 9,892,306 B2 | 2/2018 | Hillmann et al. | |
| 10,373,996 B2 | 8/2019 | Heimgartner et al. | |
| 2007/0002452 A1 | 1/2007 | Munro | |

(Continued)

FOREIGN PATENT DOCUMENTS

| | | |
|---|---|---|
| JP | 2008-182360 A | 8/2008 |
| JP | 2008-212311 A | 9/2008 |

(Continued)

OTHER PUBLICATIONS

"Spatially Resolved Spectroscopy", Retrieved from URL: <https://www.biw.kuleuven.be/biosyst/mebios/biophotonics-group/fundamental-research/spatially-resolved-spectroscopy>, Retrieved on Sep. 6, 2019, 3 pages.

*Primary Examiner* — Abdullahi Nur
(74) *Attorney, Agent, or Firm* — Sughrue Mion, PLLC

(57) ABSTRACT

Provided is a compact spectrometer including a light blocking layer having an aperture, a micro lens provided in contact with the light blocking layer, the micro lens being configured to collimate light having passed through the aperture, a filter array configured to filter the collimated light, and a photodetector array configured to detect the filtered light.

20 Claims, 6 Drawing Sheets

(56) References Cited

U.S. PATENT DOCUMENTS

| | | |
|---|---|---|
| 2008/0177185 A1 | 7/2008 | Nakao et al. |
| 2010/0252721 A1 | 10/2010 | Xu |
| 2013/0342680 A1* | 12/2013 | Zeng ............... H04N 5/332 348/135 |
| 2014/0125849 A1 | 5/2014 | Heimgarter et al. |
| 2014/0167196 A1 | 6/2014 | Heimgarter et al. |
| 2017/0109865 A1 | 4/2017 | Kim et al. |
| 2017/0135586 A1 | 5/2017 | Jeon et al. |
| 2017/0317126 A1 | 11/2017 | Heimgarter et al. |
| 2017/0357840 A1 | 12/2017 | Chen et al. |
| 2017/0357843 A1 | 12/2017 | Chen et al. |
| 2018/0136042 A1* | 5/2018 | Goldring ............ G01J 3/0289 |
| 2018/0158208 A1 | 6/2018 | Higashitsutsumi |

FOREIGN PATENT DOCUMENTS

| | | |
|---|---|---|
| JP | 2012-522579 A | 9/2012 |
| JP | 2015-535097 A | 12/2015 |

\* cited by examiner

COMPACT SPECTROMETER UNIT AND BIO-SIGNAL MEASURING APPARATUS

CROSS-REFERENCE TO RELATED APPLICATION

This application claims priority to Korean Patent Application No. 10-2018-0126623, filed on Oct. 23, 2018 in the Korean Intellectual Property Office, the entire disclosure of which is incorporated by reference herein for all purposes.

BACKGROUND

1. Field

Example embodiments of the present disclosure relate to technology for manufacturing a spectrometer in a compact size.

2. Description of the Related Art

Technology for measuring bio-signals using optics, having noninvasive and nondestructive characteristics, are applicable in various fields. Furthermore, with the development of various semiconductor optical devices, devices may be provided in a smaller size but with higher performance, and many small optical sensors have been developed based on the technology. Particularly, spectroscopy, which is technology for determining physical and chemical properties of various substances using light wavelength information, is used in many research fields, and the spectroscopic techniques are currently applied to mobile devices to be widely used in various applications.

SUMMARY

Example embodiments provide a compact spectrometer and a bio-signal measuring apparatus.

According to an aspect of an example embodiment, there is provided a compact spectrometer including a light blocking layer having an aperture, a micro lens provided in contact with the light blocking layer, the micro lens being configured to collimate light having passed through the aperture, a filter array configured to filter the collimated light, and a photodetector array configured to detect the filtered light.

A center of the aperture may be aligned with an optical axis of the micro lens.

The micro lens may include one of a plane-convex lens, a diffractive lens, and a gradient index lens.

A focal plane of the micro lens may be aligned with a surface of the micro lens that is in contact with the light blocking layer.

The filter array may include at least one of an interference filter, a diffusion filter, a plasmonic filter, and a metasurface filter.

The compact spectrometer may further include a light source array configured to emit light onto an object.

The light source array may be provided on the light blocking layer and surround the aperture.

The light source array may be arranged in a circle around the aperture.

According to an aspect of another example embodiment, there is provided a bio-signal measuring apparatus including a compact spectrometer array, and a processor configured to obtain a spectrum for each position of an object based on light detected by the compact spectrometer, and to estimate bio-information of the object by analyzing the obtained spectrum for each position of the object or to obtain depth information of the object by analyzing the obtained spectrum for each position of the object, wherein each compact spectrometer includes a light blocking layer having an aperture, a micro lens provided in contact with the light blocking layer, the micro lens being configured to collimate light having passed through the aperture, a filter array configured to filter the collimated light, and a photodetector array configured to detect the filtered light.

The bio-information may include at least one of blood information and skin information, wherein the blood information includes at least one of blood glucose, cholesterol, triglycerides, proteins, and uric acid, and wherein the skin information may include at least one of melanin, collagen, keratin, elastin, and carotenoid.

A center of the aperture may be aligned with an optical axis of the micro lens.

The micro lens may include one of a plane-convex lens, a diffractive lens, and a gradient index lens.

A focal plane of the micro lens may be aligned with a surface of the micro lens that is in contact with the light blocking layer.

The filter array may include at least one of an interference filter, a diffusion filter, a plasmonic filter, and a metasurface filter.

The apparatus may further include a light source array configured to emit light onto an object.

The light source array may be provided on the light blocking layer and surround the aperture.

The light source array may be arranged in a circle around the aperture.

The filter array may include a plurality of filters, and the photodetector array may include a plurality of detectors that correspond to the plurality of filters.

Each of the plurality of filters may be configured to transmit light of a same wavelength.

At least two of the plurality of filters may be configured to transmit light of different wavelengths.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
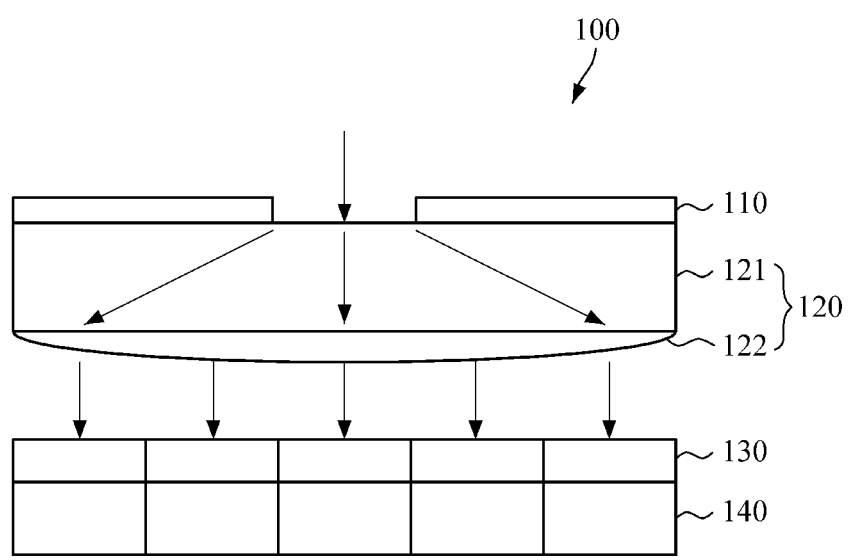
FIG. 1 is a block diagram illustrating an example of a compact spectrometer unit according to an example embodiment.

Hereinafter, example embodiments will be described in detail with reference to the accompanying drawings. It should be noted that, in the drawings, the same reference symbols refer to same parts although illustrated in other drawings.

Process steps described herein may be performed differently from a specified order, unless a specified order is clearly stated in the context of the disclosure. That is, each step may be performed in a specified order, at substantially the same time, or in a reverse order.

Further, the terms used throughout this specification are defined in consideration of the functions according to example embodiments, and can be varied according to a purpose of a user or manager, or precedent and so on. Therefore, definitions of the terms should be made on the basis of the overall context.

It will be understood that, although the terms first, second, etc. may be used herein to describe various elements, these elements should not be limited by these terms. These terms are only used to distinguish one element from another. Any references to singular may include plural unless expressly stated otherwise. It should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Further, components that will be described in the specification are discriminated merely according to functions mainly performed by the components. That is, two or more components which will be described later can be integrated into a single component. Furthermore, a single component which will be explained later can be separated into two or more components. Moreover, each component can additionally perform some or all of a function executed by another component in addition to the main function thereof. Some or all of the main function of each component can be carried out by another component. Each component may be implemented in hardware or software, or a combination thereof.

FIG. 1 is a block diagram illustrating an example of a compact spectrometer according to an example embodiment. The compact spectrometer 100 of FIG. 1 is a relatively small apparatus for separating light incident from an object, and may be embedded in an electronic device or may be enclosed in a housing to be provided as a separate device. Examples of the electronic device may include a cellular phone, a smartphone, a tablet personal computer (PC), a laptop computer, a personal digital assistant (PDA), a portable multimedia player (PMP), a navigation, an MP3 player, a digital camera, a wearable device, and the like. Examples of the wearable device may include a wristwatch-type wearable device, a wristband-type wearable device, a ring-type wearable device, a waist belt-type wearable device, a necklace-type wearable device, an ankle band-type wearable device, a thigh band-type wearable device, a forearm band-type wearable device, and the like. However, the electronic device is not limited thereto, and the wearable device is neither limited thereto.

Referring to FIG. 1, the compact spectrometer 100 includes a light blocking layer 110, a micro lens 120, a filter array 130, and a photodetector array 140.

The light blocking layer 110 is configured to block an unnecessary portion of light incident from an object. The light blocking layer 110 may be made of a light reflecting material such as metal and the like, or a light absorbing material such as a black polymer and the like. The light blocking layer 110 has an aperture and may come into contact with one surface of the micro lens 120. A center of the aperture may be aligned with an optical axis of the micro lens 120.

The micro lens 120 comes into contact with the light blocking layer 110, and may collimate light having passed through the aperture of the light blocking layer 110. The micro lens 120 may include a glass substrate 121 and a plane-convex lens 112. A focal plane of the micro lens 120 may be aligned with one surface of the glass substrate 121 which is in contact with the light blocking layer 110.

The filter array 130 may filter the collimated light from the micro lens 120. The filter array 130 may include a plurality of filters which pass light of a predetermined wavelength among the collimated light beams. The plurality of filters may pass light of different wavelengths or may pass light of the same wavelength. Further, some of the plurality of filters may pass light of the same wavelength, and others of the plurality of light sources may pass light of different wavelengths. According to an example embodiment, the filter array 130 may include an interference filter, a diffusion filter, a plasmonic filter, a metasurface filter, and the like, but is not limited thereto.

The photodetector array 140 may detect light filtered by the filter array 130. The photodetector array 140 may include a plurality of photodetectors which may detect light having passed through each filter of the filter array 130. Each photodetector may detect light having passed through a filter corresponding to each photodetector. According to an example embodiment, each photodetector may include a photo diode, a photo transistor (PTr), a charge-coupled device (CCD), a complementary metal-oxide semiconductor (COMS), and the like, but is not limited thereto.

While FIG. 1 illustrates an example where the micro lens 120 includes the glass substrate 121 and the plane-convex lens 122, the micro lens 120 is not limited thereto. That is, the micro lens 120 may be composed of a diffractive lens, a gradient index lens (GRIN lens), and the like.

Figure 2:
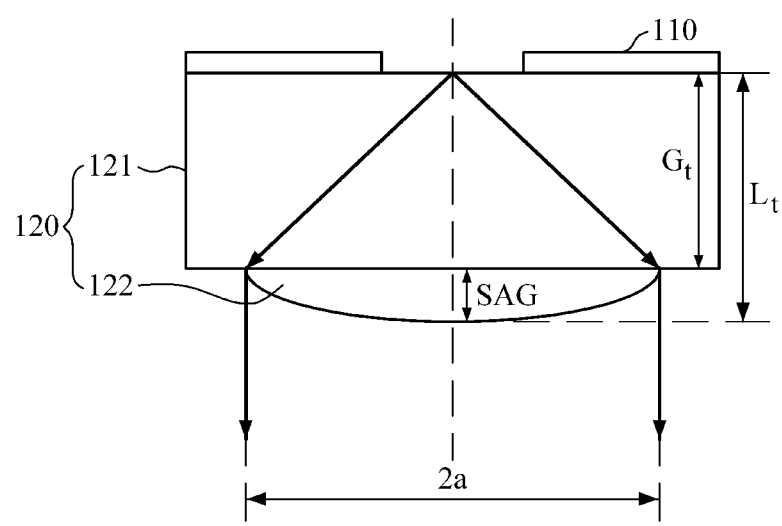
FIG. 2 is a diagram explaining an example of forming a micro lens according to an example embodiment.

FIG. 2 is a diagram explaining an example of forming a micro lens. FIG. 2 illustrates an example in which the glass substrate 121 and the plane-convex lens 122 are formed by grinding glass having a refractive index n. The refractive index n may be, for example, 1.46.

Referring to FIG. 2, when the width of the plane-convex lens 122 is 2a, and a radius curvature is Rc, the thickness $G_t$ of the glass substrate 121 may be $n*R_C/(n-1)$, the sagittal height (SAG) of the plane-convex lens 122 may be $R_C-(R_C^2-a^2)^{1/2}$, and a total thickness $L_t$ of the micro lens 120 may be $G_t+SAG$. For example, when the width of the plane-convex lens 122 2a is 250 μm and the radius curvature Rc is 173 μm, the thickness $G_t$ of the glass substrate 121 may be 555.5, the sagittal height SAG of the plane-convex lens 122 may be 52.5 μm, and the total thickness $L_1$ of the micro lens 120 may be 608 μm.

In this example, the focal plane of the micro lens 120 may be aligned with a surface opposite to a surface of the glass substrate 121 on which the plane-convex lens 122 is formed, and the light blocking layer 110 having an aperture may be disposed on the focal plane of the micro lens 120.

A collimation cone angle may be determined by a focal length and the size of an aperture of the micro lens 120. For example, the collimation cone angle is approximately $\tan^{-1}$ (aperture radius/focal length), and in the example where the aperture radius is approximately 50 μm, the collimation cone angle may be around 5 degrees.

Figure 3:
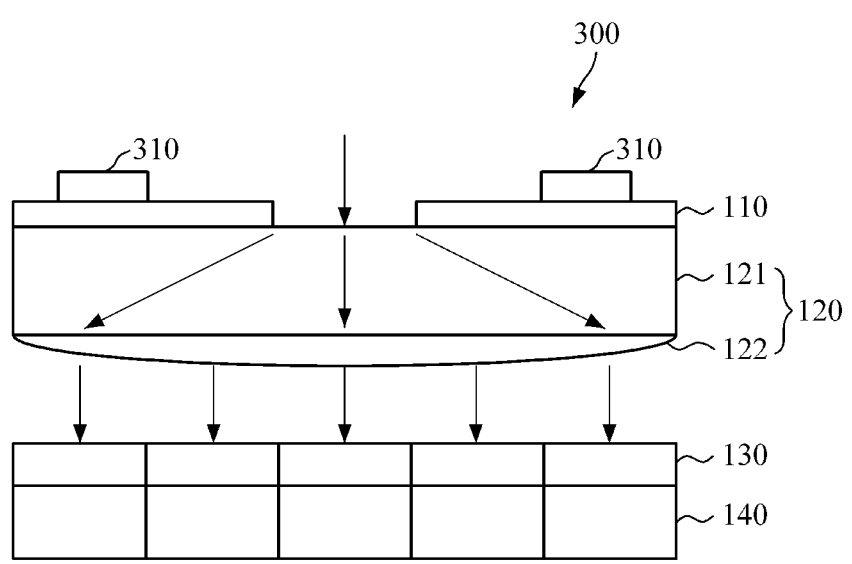
FIG. 3 is a diagram illustrating an example of a compact spectrometer unit according to an example embodiment.

FIG. 3 is a diagram illustrating an example of a compact spectrometer 300 according to an example embodiment. The compact spectrometer 300 of FIG. 3 is a relatively small apparatus which may separate light, and may be embedded in an electronic device or may be enclosed in a housing to be provided as a separate device. Examples of the electronic device may include a cellular phone, a smartphone, a tablet PC, a laptop computer, a PDA, a PMP, a navigation, an MP3 player, a digital camera, a wearable device, and the like. Examples of the wearable device may include a wristwatch-type wearable device, a wristband-type wearable device, a ring-type wearable device, a waist belt-type wearable device, a necklace-type wearable device, an ankle band-type wearable device, a thigh band-type wearable device, a forearm band-type wearable device, and the like. However, the electronic device is not limited thereto, and the wearable device is neither limited thereto.

Referring to FIG. 3, the compact spectrometer 300 includes a light blocking layer 110, a micro lens 120, a filter array 130, and a photodetector array 140, and a light source array 310. The light blocking layer 110, the micro lens 120, the filter array 130, and the photodetector array 140 are described above with reference to FIG. 1.

The light source array 310 may include a plurality of light sources which emit light onto an object. The plurality of light sources may emit light of a predetermined wavelength, for example, visible light or mid-infrared light, onto an object. The plurality of light sources may emit light of different wavelengths onto an object, or may emit light of the same wavelength. Further, some of the plurality of light sources may emit light of the same wavelength, and others of the plurality of light sources may emit light of different wavelengths. According to an example embodiment, each light source may include a light-emitting diode (LED), an organic light emitting diode (OLED), quantum dot light-emitting diodes (QLEDs), a laser diode, a fluorescent body, and the like.

According to an example embodiment, the plurality of light sources of the light source array 310 may be arranged in a circle around an aperture formed at the center of the light blocking layer 110. For example, the aperture may be formed at the center of the light source array 310, and n number of light sources may be arranged in a circle around the aperture. Each of the light sources may emit light of peak wavelengths of $\lambda_1, \lambda_2, \lambda_3, \ldots,$ and $1X$, respectively. The light sources may be driven either sequentially or simultaneously according to a control signal to emit light of predetermined peak wavelengths. In this example, a portion of light reflected or scattered from an object sequentially passes through the micro lens 120 and the filter array 130 to be detected by the photodetector array 140, and the remaining light may be reflected or absorbed by the light blocking layer 100.

Figure 4:
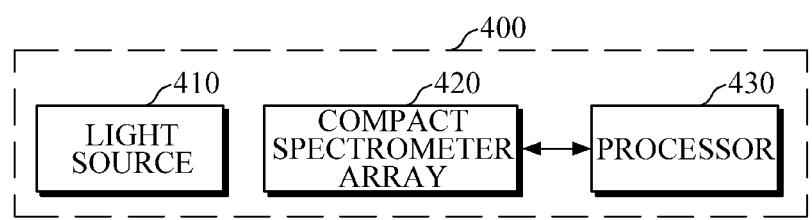
FIG. 4 is a diagram illustrating an example of a bio-signal measuring apparatus according to an example embodiment.

FIG. 4 is a diagram illustrating an example of a bio-signal measuring apparatus according to an example embodiment. The bio-signal measuring apparatus of FIG. 4 is an apparatus for obtaining a spectrum for each position of an object, and may be embedded in an electronic device or may be enclosed in a housing to be provided as a separate device. Examples of the electronic device may include a cellular phone, a smartphone, a tablet PC, a laptop computer, a PDA, a PMP, a navigation, an MP3 player, a digital camera, a wearable device, and the like. Examples of the wearable device may include a wristwatch-type wearable device, a wristband-type wearable device, a ring-type wearable device, a waist belt-type wearable device, a necklace-type wearable device, an ankle band-type wearable device, a thigh band-type wearable device, a forearm band-type wearable device, and the like. However, the electronic device is not limited thereto, and the wearable device is neither limited thereto.

Referring to FIG. 4, the bio-signal measuring apparatus 400 includes a light source 410, a compact spectrometer array 420, and a processor 430.

The light source 410 may emit light onto an object. For example, the light source 410 may emit light of a predetermined wavelength, for example, visible light or near-infrared light, onto an object. However, the wavelengths of light emitted by the light source 410 may vary depending on the purpose of measurement or types of an analyte. Further, the light source 410 may be a single light emitting body or an array of a plurality of light emitting bodies. According to an example where the light source 410 is formed as an array of a plurality of light emitting bodies, the plurality of light emitting bodies may emit light of different wavelengths, or may emit light of the same wavelength. Further, some of the light sources may emit light of the same wavelength, and others of the light sources may emit light of different wavelengths. In one embodiment, the light source 410 may include an LED, an OLED, QLEDs, a laser diode, a fluorescent body, and the like. However, embodiments are not limited thereto.

In addition, in the example where the compact spectrometer array 420 includes a separate light source, the light source 410 may be omitted.

The compact spectrometer array 420 may include a plurality of compact spectrometers, for example, the compact spectrometer 100 and the compact spectrometer 300 described above with reference to FIGS. 1 to 3.

The processor 430 may control the overall operation of the bio-signal measuring apparatus 400.

The processor 430 may obtain a spectrum for each position of an object based on light detected by the compact spectrometer array 420. For example, when the compact spectrometer array 420 includes a first compact spectrometer and a second compact spectrometer, the first compact spectrometer may come into contact with a first position of the object, and the second compact spectrometer may come into contact with a second position of the object. The first compact spectrometer may detect light incident from the first position of the object, and the second compact spectrometer may detect light incident from the second position of the object. The processor 430 may obtain a first spectrum for the first position of the object based on the light detected by the first compact spectrometer and may obtain a second spectrum for the second position of the object based on the light detected by the second compact spectrometer.

Based on the spectra obtained for each position of the object, for example, the processor 430 may estimate bio-information of the object or may obtain depth information of the object.

According to an example embodiment, the processor 430 may calculate an average spectrum by averaging the spectra obtained for each position of the object, and may estimate bio-information by analyzing the calculated average spectrum. In this example, the bio-information may include blood component information including blood glucose, cholesterol, triglycerides, proteins, uric acid, and the like, and skin component information including melanin, collagen, keratin, elastin, and the like.

According to an example embodiment, the processor 430 may obtain depth information of an object from the spectra obtained for each position of the object. As each of the compact spectrometers comes into contact with different positions of the object, each of the compact spectrometers may detect light incident from different positions of the object. Light detected by each of the compact spectrometers may include different depth information of the object according to a distance between the light source and each of the compact spectrometers. Accordingly, the processor 430 may obtain depth information of the object from the spectra obtained for each position of the object.

Figure 5:
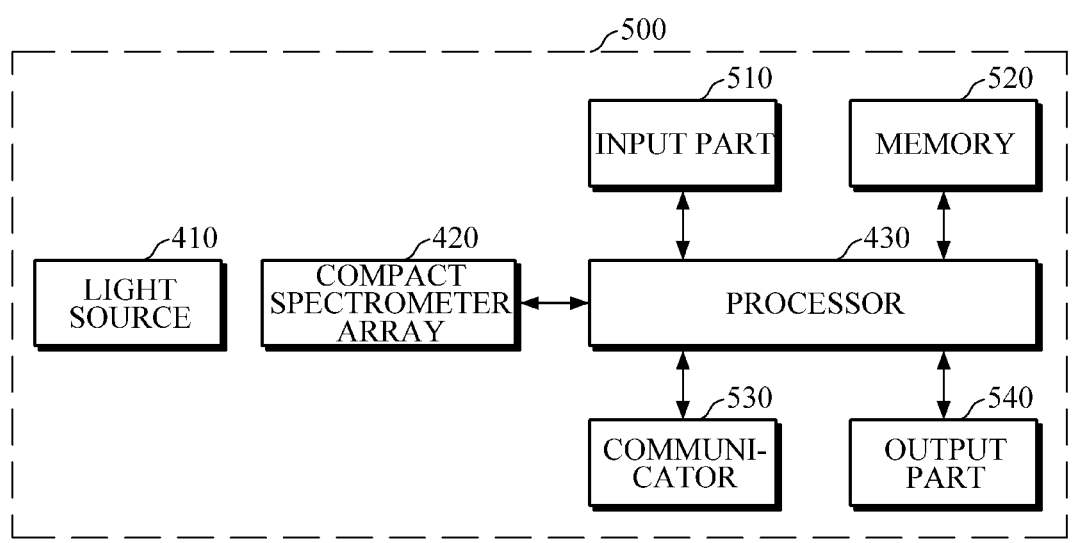
FIG. 5 is a diagram illustrating an example of a bio-signal measuring apparatus according to an example embodiment.

FIG. 5 is a diagram illustrating a bio-signal measuring apparatus according to an example embodiment. The bio-signal measuring apparatus 500 of FIG. 5 is an apparatus for obtaining a spectrum for each position of an object, and may be embedded in an electronic device or may be enclosed in a housing to be provided as a separate device. Examples of the electronic device may include a cellular phone, a smartphone, a tablet PC, a laptop computer, a PDA, a PMP, a navigation, an MP3 player, a digital camera, a wearable device, and the like. Examples of the wearable device may include a wristwatch-type wearable device, a wristband-type wearable device, a ring-type wearable device, a waist belt-type wearable device, a necklace-type wearable device, an ankle band-type wearable device, a thigh band-type wearable device, a forearm band-type wearable device, and the like. However, the electronic device is not limited thereto, and the wearable device is neither limited thereto.

Referring to FIG. 5, the bio-signal measuring apparatus 500 includes the light source 410, the compact spectrometer array 420, the processor 430, an input part (input interface) 510, a memory 520, a communicator (communication interface) 530, and an output part (output interface) 540. The light source 410, the compact spectrometer array 420, and the processor 430 are described above with reference to FIG. 4.

The input part 510 may receive input of various operation signals from a user. According to an example embodiment, the input part 510 may include a keypad, a dome switch, a touch pad (static pressure/capacitance), a jog wheel, a jog switch, a hardware (H/W) button, and the like. The touch pad, which forms a layer structure with a display, may include a touch screen.

The memory 520 may store programs or commands for operation of the bio-signal measuring apparatus 500, and may store data input to and output from the bio-signal measuring apparatus 500. Further, the memory 520 may store the detected light signal, the spectra obtained for each position of the object, the bio-information of the object, the depth information of the object, and the like.

The memory 520 may include at least one storage medium of a flash memory type memory, a hard disk type memory, a multimedia card micro type memory, a card type memory (e.g., an SD memory, an XD memory, etc.), a random access memory (RAM), a static random access memory (SRAM), a read only memory (ROM), an electrically erasable programmable read only memory (EEPROM), a programmable read only memory (PROM), a magnetic memory, a magnetic disk, and an optical disk, and the like. Further, the bio-signal measuring apparatus 500 may operate an external storage medium, such as web storage and the like, which performs a storage function of the memory 520.

The communicator 530 may perform communication with an external device. For example, the communicator 530 may transmit, to the external device, data input to the bio-signal measuring apparatus 500, data stored in or processed by the bio-signal measuring apparatus 500, and the like; or may receive, from the external device, various data required or useful for estimating bio-information of an object or obtaining depth information of an object.

The external device may be, for example, a medical equipment using the data input to the bio-signal measuring apparatus 500, the data stored in or processed by the bio-signal measuring apparatus 500, and the like, a printer to print out results, or a display to display the results. In addition, the external device may be a digital TV, a desktop computer, a cellular phone, a smartphone, a tablet PC, a laptop computer, a PDA, a PMP, a navigation, an MP3 player, a digital camera, a wearable device, and the like, but the external device is not limited thereto.

The communicator 530 may be a communication interface that communicates with an external device by using Bluetooth communication, Bluetooth Low Energy (BLE) communication, near field communication (NFC), wireless local area network (WLAN) communication, Zigbee communication, infrared data association (IrDA) communication, Wi-Fi Direct (WFD) communication, ultra-wideband (UWB) communication, Ant+ communication, Wi-Fi communication, radio frequency identification (RFID) communication, 3G communication, 4G communication, 5G communication, and the like. However, example embodiments are not limited thereto.

The output part 540 may output the data input to the bio-signal measuring apparatus 500, the data stored in or processed by the bio-signal measuring apparatus 500, and the like. According to an example embodiment, the output interface 540 may output the data input to the bio-signal measuring apparatus 500, the data stored in or processed by the bio-signal measuring apparatus 500, and the like by using at least one of an acoustic method, a visual method, and a tactile method. The output part 540 may include a display, a speaker, a vibrator, and the like.

Figure 6:
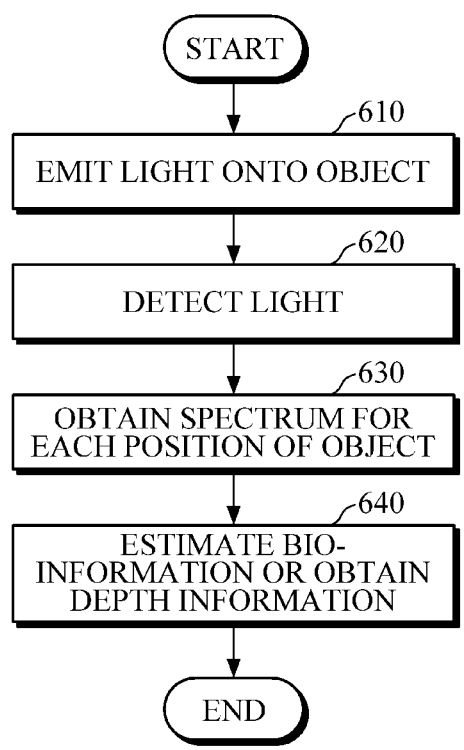
FIG. 6 is a flowchart illustrating an example of a bio-signal measuring method according to an example embodiment.

FIG. 6 is a flowchart illustrating an example of a bio-signal measuring method. The bio-signal measuring method of FIG. 6 may be performed by the bio-signal measuring apparatus 400 of FIG. 4 and bio-signal measuring apparatus of FIG. 5.

Referring to FIG. 6, the bio-signal measuring apparatus may emit light onto an object in 610, and may detect light returning from different positions of the object in 620. In this example, the bio-signal measuring apparatus may use a compact spectrometer array including a plurality of compact spectrometers described above with reference to FIGS. 1 to 3.

The bio-signal measuring apparatus may obtain a spectrum for each position of the object based on the detected light in 630. For example, when the compact spectrometer array includes a first compact spectrometer and a second compact spectrometer, the first compact spectrometer may come into contact with a first position of the object, and the second compact spectrometer may come into contact with a second position of the object. The first compact spectrometer may detect light incident from the first position of the object, and the second compact spectrometer may detect light incident from the second position of the object. The bio-signal measuring apparatus may obtain a first spectrum for the first position of the object based on the light detected by the first compact spectrometer and may obtain a second spectrum for the second position of the object based on the light detected by the second compact spectrometer.

Based on the spectrum obtained for each position of the object, the bio-signal measuring apparatus may estimate bio-information of the object or may obtain depth information of the object in 640.

According to an example embodiment, the bio-signal measuring apparatus may calculate an average spectrum by averaging the spectra obtained for each position of the object, and may estimate bio-information by analyzing the calculated average spectrum. In this example, the bio-information may include blood component information including blood glucose, cholesterol, triglycerides, proteins, uric acid, and the like; and skin component information including melanin, collagen, keratin, elastin, carotenoid, and the like.

According to an example embodiment, the bio-signal measuring apparatus may obtain depth information of an object from the spectra obtained for each position of the object. As each of the compact spectrometers comes into contact with different positions of the object, the compact spectrometers may detect light incident from different positions of the object. Light detected by each of the compact spectrometers may include different depth information of the object according to a distance between the light source and each of the compact spectrometers. Accordingly, the bio-signal measuring apparatus may obtain depth information of the object from the spectra obtained for each position of the object.

The instructions or software to control a processor and perform the methods as described above, and any associated data, data files, and data structures, are recorded, stored, or fixed in or on one or more non-transitory computer-readable storage media. Examples of a non-transitory computer-readable storage medium include a ROM, a RAM, a CD-ROM, a magnetic tape, a floppy disc, an optical disc, and the like. The computer-readable recording medium can be distributed over a plurality of computer systems connected to a network so that a computer-readable code is written thereto and executed therefrom in a decentralized manner.

It should be understood that embodiments described herein should be considered in a descriptive sense only and not for purposes of limitation.

While example embodiments have been described with reference to the figures, it will be understood by those of ordinary skill in the art that various changes in form and details may be made therein without departing from the spirit and scope as defined by the following claims

What is claimed is:

1. A compact spectrometer comprising:
   a light blocking layer having an aperture;
   a micro lens which directly contacts the light blocking layer, the micro lens being configured to collimate light having passed through the aperture;
   a filter array configured to filter the collimated light; and
   a photodetector array configured to detect the filtered light.

2. The compact spectrometer of claim 1, wherein a center of the aperture is aligned with an optical axis of the micro lens.

3. The compact spectrometer of claim 1, wherein the micro lens comprises one of a plane-convex lens, a diffractive lens, and a gradient index lens.

4. A compact spectrometer comprising:
   a light blocking layer having an aperture;
   a micro lens which contacts the light blocking layer, the micro lens being configured to collimate light having passed through the aperture;
   a filter array configured to filter the collimated light; and
   a photodetector array configured to detect the filtered light,
   wherein a focal plane of the micro lens is aligned with a surface of the micro lens that is in contact with the light blocking layer.

5. The compact spectrometer of claim 1, wherein the filter array comprises at least one of an interference filter, a diffusion filter, a plasmonic filter, and a metasurface filter.

6. The compact spectrometer of claim 1, further comprising a light source array configured to emit light onto an object.

7. The compact spectrometer of claim 6, wherein the light source array is provided on the light blocking layer and surrounds the aperture.

8. The compact spectrometer of claim 6, wherein the light source array is arranged in a circle around the aperture.

9. A bio-signal measuring apparatus comprising:
   a compact spectrometer array; and
   a processor configured to obtain a spectrum for each position of an object based on light detected by the compact spectrometer array, and to estimate bio-information of the object by analyzing the obtained spectrum for each position of the object or to obtain depth information of the object by analyzing the obtained spectrum for each position of the object,
   wherein each compact spectrometer comprises:
      a light blocking layer having an aperture;
      a micro lens provided in contact with the light blocking layer, the micro lens being configured to collimate light having passed through the aperture;
      a filter array configured to filter the collimated light; and
      a photodetector array configured to detect the filtered light.

10. The apparatus of claim 9, wherein the bio-information comprises at least one of blood information and skin information,
   wherein the blood information comprises at least one of blood glucose, cholesterol, triglycerides, proteins, and uric acid, and
   wherein the skin information comprises at least one of melanin, collagen, keratin, elastin, and carotenoid.

11. The apparatus of claim 9, wherein a center of the aperture is aligned with an optical axis of the micro lens.

12. The apparatus of claim 9, wherein the micro lens comprises one of a plane-convex lens, a diffractive lens, and a gradient index lens.

13. The apparatus of claim 9, wherein a focal plane of the micro lens is aligned with a surface of the micro lens that is in contact with the light blocking layer.

14. The apparatus of claim 9, wherein the filter array comprises at least one of an interference filter, a diffusion filter, a plasmonic filter, and a metasurface filter.

15. The apparatus of claim 9, further comprising a light source array configured to emit light onto the object.

16. The apparatus of claim 15, wherein the light source array is provided on the light blocking layer and surrounds the aperture.

17. The apparatus of claim 15, wherein the light source array is arranged in a circle around the aperture.

18. The compact spectrometer of claim 1, wherein the filter array comprises a plurality of filters, and the photodetector array comprises a plurality of detectors that correspond to the plurality of filters.

19. The compact spectrometer of claim 18, wherein each of the plurality of filters is configured to transmit light of a same wavelength.

20. The compact spectrometer of claim 18, wherein at least two of the plurality of filters are configured to transmit light of different wavelengths.

* * * * *